Jan. 22, 1952

J. E. BECKER 2,582,952

FLUID CIRCULATION CONTROLS FOR ROTARY
PUMP AND TURBINE FLUID COUPLINGS

Filed Dec. 31, 1947

Inventor
JOHN E. BECKER
By
Attorney

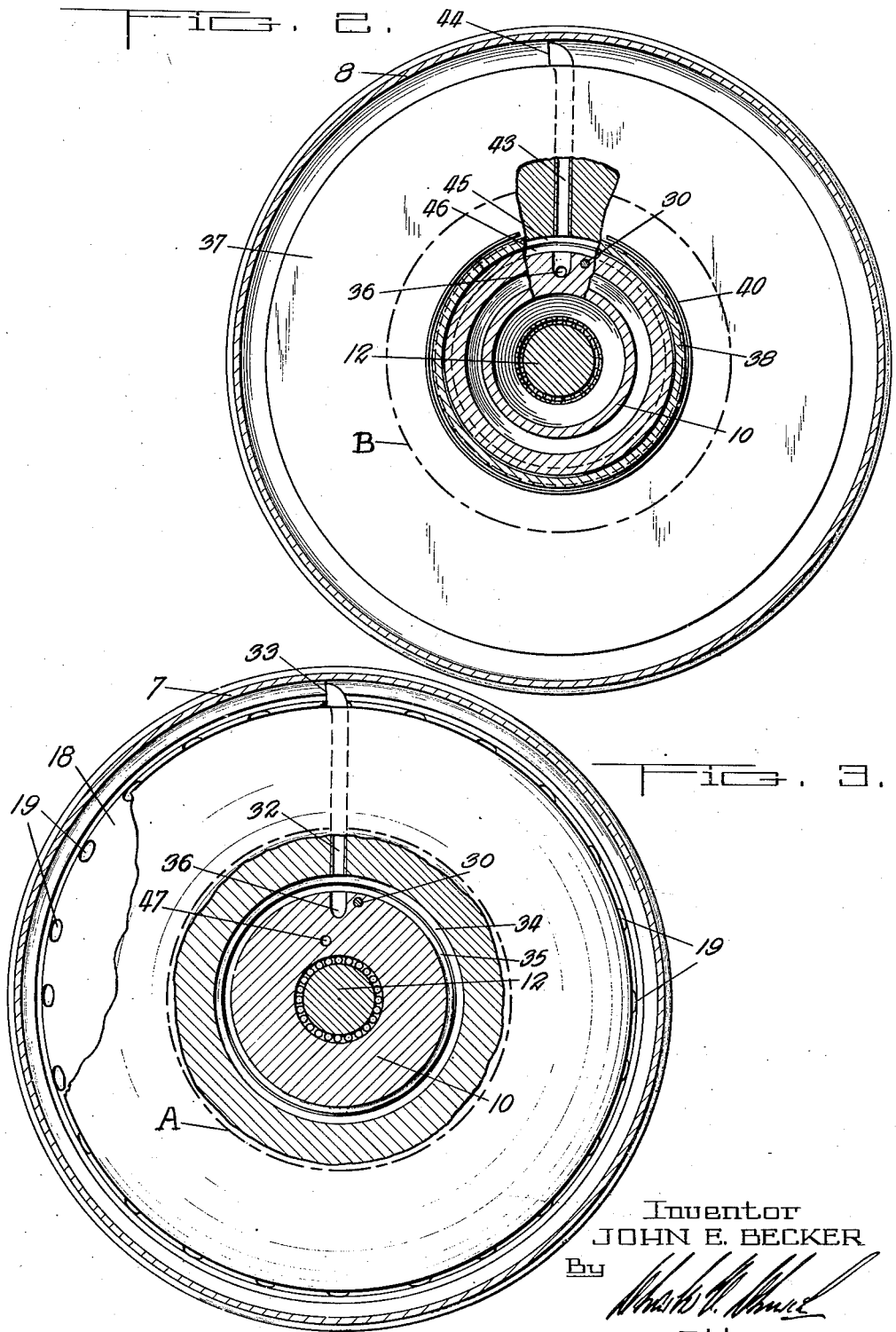

Jan. 22, 1952     J. E. BECKER     2,582,952
FLUID CIRCULATION CONTROLS FOR ROTARY
PUMP AND TURBINE FLUID COUPLINGS
Filed Dec. 31, 1947     4 Sheets-Sheet 3
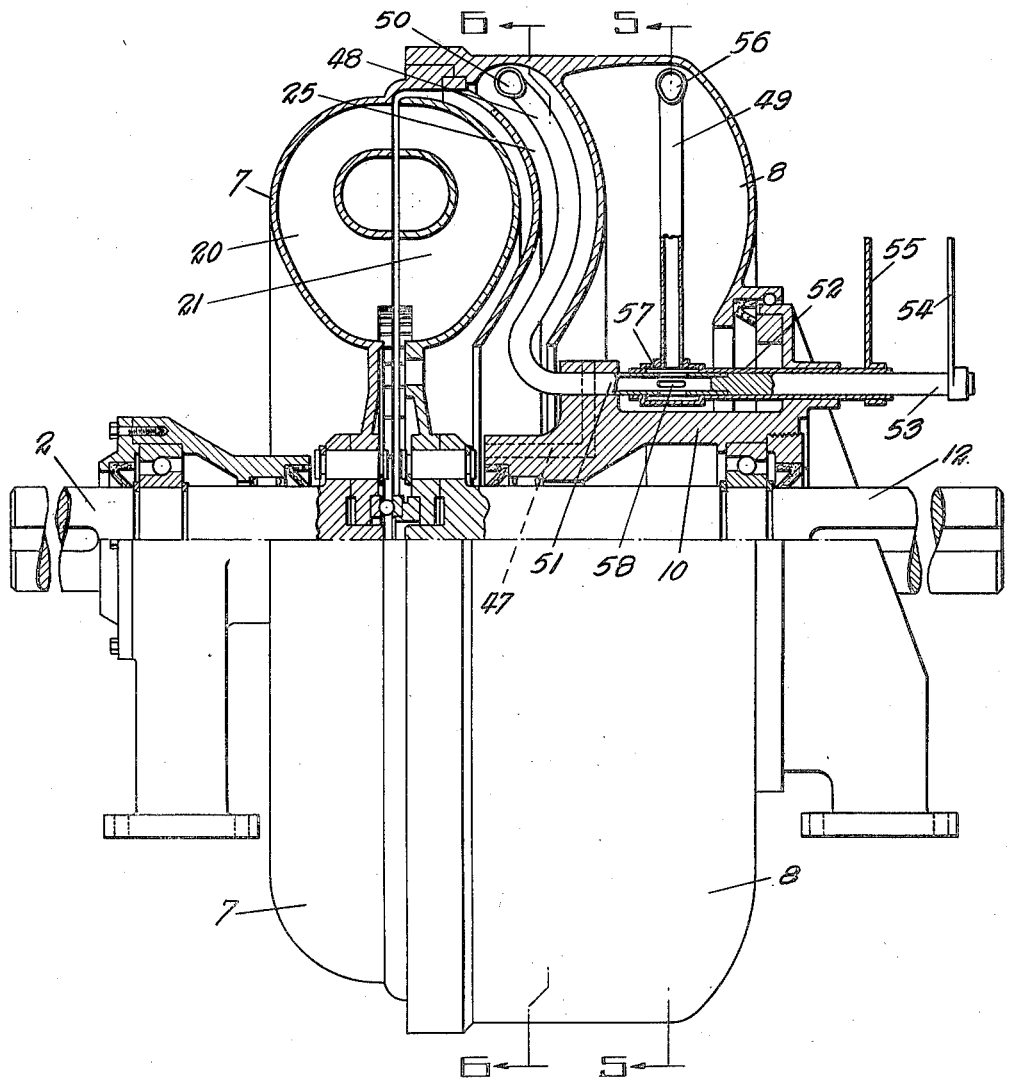
FIG. 4.
Inventor
JOHN E. BECKER
By
Attorney

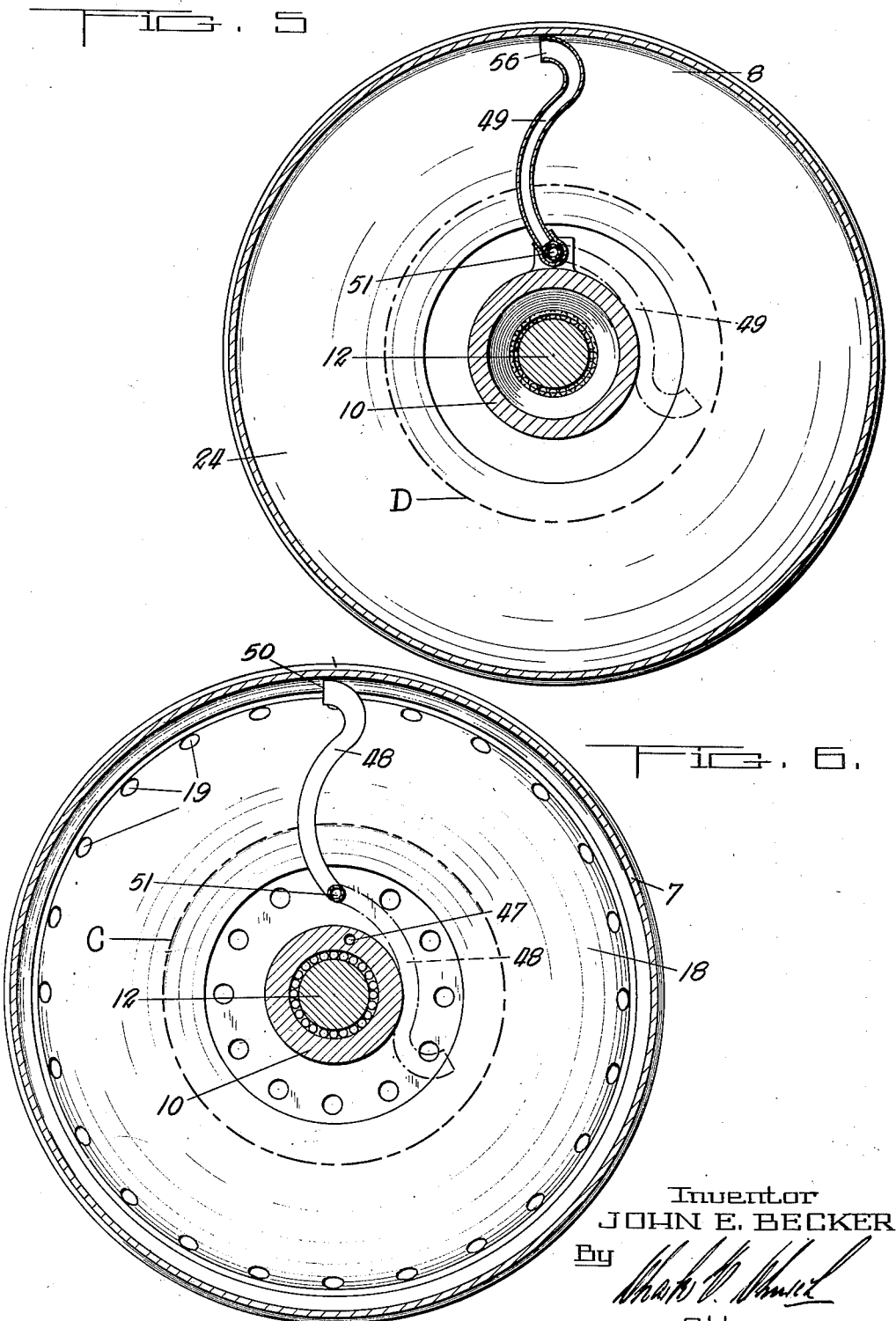

Patented Jan. 22, 1952

2,582,952

UNITED STATES PATENT OFFICE 2,582,952

FLUID CIRCULATION CONTROLS FOR ROTARY PUMP AND TURBINE FLUID COUPLINGS

John Edward Becker, Darlington Township, Durham County, Ontario, Canada

Application December 31, 1947, Serial No. 795,055

2 Claims. (Cl. 60—54)

This invention relates to improvements in fluid circulation controls for rotary pump and turbine fluid couplings and is a continuation in part of my patent applications Serial Number 749,562, filed May 21, 1947, now patent No. 2,508,442 which issued May 23, 1950, and Serial No. 788,500, filed November 28, 1947, now Patent No. 2,568,-706, where in the first application I disclose the use of a fluid discharge scoop pipe swingably contained within the rotatable impeller housing and adapted to be moved into and out of the fluid ring within the housing, and in the second application I disclose the scoop pipe contained within a disc mounted concentrically with the centre of rotation of the impeller housing to eliminate fluid impact against the length of the pipe by the rotating fluid ring.

The object of the present invention is to provide a fluid reservoir which is designed to rotate with the impeller housing, whereby the fluid in the rotating reservoir is in the form of a fluid ring and wherein a scoop pipe is container within the reservoir for removing fluid therefrom and directing it into the impeller housing, the fluid being removed from the housing in the manner described in my co-pending applications Serial No. 749,562 and Serial No. 788,500.

With the foregoing and other objects in view as shall become apparent upon perusal of the specification and upon reference to the drawings, my invention consists of a fluid coupling constructed and arranged all as hereinafter more particularly described and illustrated in the accompanying drawings in which:

Fig. 1 is a side elevational view of the coupling and reservoir assembly wherein the scoop pipes are contained within discs, the upper half thereof being shown in section.

Fig. 2 is a vertical cross-sectional view taken through the line 2—2, Fig. 1.

Fig. 3 is a vertical cross-sectional view taken through the line 3—3, Fig. 1.

Fig. 4 is a side elevational view of the coupling and reservoir assembly wherein the scoop pipes are swingably mounted, the upper half thereof being shown in section.

Fig. 5 is a vertical cross-sectional view taken through the line 5—5, Fig. 4, and Fig. 6 is a vertical cross-sectional view taken through the line 6—6, Fig. 4.

Like characters of reference indicate corresponding parts in the different views of the drawings.

Referring to Fig. 1, the driving shaft 2 is supported by ball and roller races 3 and 4 carried within a suitably supported bearing bracket 5.

The inner end of the driving shaft 2 is formed with a flange 6, and an impeller housing 7 of orbicular form and of substantially 8-shaped cross-section is secured to the face of the flange 6 to rotate with the driving shaft 2. The housing 7 is formed with a fluid reservoir 8 constituting an extension of the housing and carried by a ball bearing 9 mounted upon a stationary hub shell 10. A fluid seal ring 11 is positioned adjacent to the ball bearing 9.

The hub shell 10 contains a driven shaft 12 mounted within roller and ball races 13 and 14; fluid seal rings 15 being also provided. The inner end of the driven shaft 12 carries a flange 16, and a concave ring-shaped runner housing 17 is secured to the flange and contained within the impeller housing 7. The impeller housing 7 contains a partition wall 18 which is shaped to follow the contour of the runner housing 17. The outer edge of the partition 18 is welded or otherwise secured to the inner face of the peripheral wall of the housing 7 and is formed in its center with an orifice of greater diameter than the portion of the stationary hub 10 which it surrounds. The outer portion of the partition wall is pierced with a plurality of orifices 19 through which fluid passes in entering and leaving the housing 7.

The impeller housing 7 and the runner housing 17 carry a plurality of the usual radial impeller blades 20 and 21 supporting the usual ring members 22 and 23, so that passages are formed for the fluid transmission of power.

The impeller housing 7 contains a second partition wall 24 which forms the inner wall of the reservoir 8 and is shaped to follow the contour of the partition wall 18, being spaced away therefrom to form a compartment 25 within which the fluid outlet scoop pipe for the impeller housing is contained, as shall be hereinafter described. The partition wall 24 rotates free of the hub shell 10 and is formed integrally with the peripheral wall of the reservoir 8.

The compartment 25 formed by the walls 18 and 24 contains a disc 26 which is of suitable dish form to follow the contour of the walls and is mounted upon a boss 27 carried by roller bearings 28 positioned upon the hub 10. One portion of the boss 27 is surrounded by a brake band 29 actuated by a manually operated handle rod 30 extending through the hub 10 and carrying an arm 31 on its inner end which is connected to the brake band 29, so that rotation of the handle rod 30 in one direction will cause the brake band to engage the boss 27 and thus retard rotation of the disc 26.

The disc 26 contains a radial scoop pipe 32 embedded therein and having its outer end protruding from the periphery of the disc and formed with a fluid entrance 33 directed towards the direction of rotation of the fluid ring A in the impeller housing 7. The inner face of the boss 27 is formed with a fluid passage groove 34 which is complementary to a similar groove 35 in the hub 10. The groove 35 opens into a passageway 36 within the hub 10, which passageway forms a communication with the reservoir 8. The inner end of the scoop pipe 32 opens into the groove 34, so that fluid may always flow from the scoop pipe 32 through the grooves 34 and 35 into the passageway 36, or vice versa.

The fluid reservoir 8 contains a disc 37 mounted upon a boss 38 carried by roller bearings 39 positioned upon the hub 10. One portion of the boss 38 is surrounded by a brake band 40 actuated by a sleeve 41 surrounding rod 30 and carrying an arm 42 on its inner end which is connected to the brake band 40, whereby rotation of the sleeve 41 in one direction causes the brake band to engage the boss 38 and thus retard rotation of the disc 37.

The disc 37 contains a radial pipe 43 embedded therein and having its outer end protruding from the periphery of the disc and formed with a fluid entrance 44 directed towards the direction of rotation of the fluid ring B within the reservoir 8. The inner face of the boss 38 is formed with a fluid passage groove 45 which is complementary to a similar groove 46 in the hub 10. The passageway 36 opens into the groove 46. The inner end of the scoop pipe 43 opens into the groove 45 in the boss 38, so that fluid may always flow from the scoop pipe 43 through the grooves 45 and 46 into the passageway 36, or vice versa. In order to effect an equalization of air pressure between the impeller housing 7 and the fluid reservoir 8 an air relief passage 47 is provided within the hub shell 10 to form a communication between the central portion of the impeller housing 7 and the central portion of the fluid reservoir 8.

*Operation*

When the impeller housing 7 contains its full measure of fluid and full power is being transmitted from the driving shaft 2 to the driven shaft 12 the discs 26 and 37, contained respectively within the impeller housing 7 and the fluid reservoir 8, are permitted to freely rotate, and will do so at substantially the same speed as the speed of rotation of the fluid rings within the impeller housing 7 and the fluid reservoir 8.

If it is desired to reduce the speed of the driven shaft 12 in relation to the speed of the driving shaft 2, the brake 29 is partially applied through actuation of the handle rod 30 so that the speed of rotation of the disc 26 is reduced, whereby the fluid ring A within the impeller housing 7 will be moving faster than the outer end of the scoop pipe 32 and fluid will therefore enter the scoop pipe to pass through the passageway 36 and through the rotating scoop pipe 37 into the reservoir 8. By stopping the rotation of the disc 26, through application of the brake, fluid will be instantly removed from the impeller housing 7 thus breaking the fluid connection between the impeller blades 20 and the runner blades 21 whereby the driven shaft 12 will come to a standstill.

When the disc 37 is free to rotate it will be rotated by the fluid ring B in the fluid reservoir 8 which rotates in unison with the impeller housing 7. In order to remove fluid from the rotating fluid reservoir 8 and inject it into the impeller housing 7 the brake 40 is partially applied through actuation of the sleeve 41, so that the speed of rotation of the disc 37 is reduced in relation to the speed of the fluid ring in the reservoir 8, whereby fluid will enter the scoop pipe 43 and pass from thence through the passageway 36 and through the scoop pipe 32 into the impeller housing 7.

Figs. 4, 5 and 6 show an alternative fluid circulation control. In this construction the rotatable discs 26 and 37 are replaced by open ended scoop pipes 48 and 49 contained respectively within the compartment 25 in the impeller housing 7 and fluid reservoir 8, the scoop pipes being swingably mounted whereby they may be removed from out of the fluid rings C and D in the impeller housing 7 and fluid reservoir 8.

The scoop pipe 48 within the compartment 25 is formed at its outer end with a suitably directed intake orifice 50 pointed towards the direction of rotation of the fluid ring C and the body of the scoop pipe is so curved that it may be swung close to the hub shell 10, as illustrated in dotted lines in Fig. 6. The scoop pipe 48 is carried upon the end of a straight length of pipe 51 which is rotatably mounted within the hub shell 10 and projects into a sleeve 52 also carried within the hub shell 10. A handle rod 53 forms a plug for the end of the pipe 51 and is secured thereto so that movement of the handle 54 will swing the scoop pipe 48.

The scoop pipe 49 within the fluid reservoir 8 projects from the sleeve 52 and the outer end of such sleeve carries a handle 55 whereby movement of such handle will swing the scoop pipe 49. The scoop pipe 49 is formed with a fluid inlet orifice 56 and is of the same shape as the scoop pipe 48, as will be seen upon reference to Fig. 5. The sleeve 52 is formed with an enlarged diameter portion 57 from which the scoop pipe 49 projects, and the part of the pipe 51 contained within the portion 57 contains a plurality of orifices 58 whereby communication is established between the scoop pipe 49 and the pipe 51 connected to the scoop pipe 48, irrespective of the swung positions of either of the scoop pipes.

*Operation*

It will be understood that when the impeller housing 7 and the connected fluid reservoir 8 are rotating, that the fluid therein will be in the form of centrifugal fluid rings. When the coupling is operating at full capacity the scoop pipes 48 and 49 are swung substantially into the positions shown in dotted lines in Figs. 5 and 6 wherein their open ends are removed from out of contact with the fluid rings C and D. If it is desired to remove a portion of the fluid from the impeller housing 7 the scoop pipe 48 is swung upwardly by rotation of the handle 54 so that its open end enters the fluid ring whereby fluid will flow through the scoop pipe 48, pipe 51 and scoop pipe 49 to enter the fluid reservoir 8. The quantity of fluid removed from the impeller housing 7 is governed by the depth of entry of the open end of the scoop pipe 48 into the fluid ring. When the scoop pipe is in the position illustrated in Fig. 6 the contained fluid will be completely removed.

In order to inject fluid from the reservoir 8 into the impeller housing 7 the scoop pipe 49 is swung by means of the handle 55 so that its open end enters the fluid ring D whereby fluid will pass through the scoop pipe 49, pipe 51 and scoop pipe 48 into the impeller housing 7. The quantity of fluid injected into the impeller housing 7 will be governed by the depth of insertion of the open end of the scoop pipe 49 into the fluid ring in the reservoir 8. It will thus be appreciated that any desired speed relationship between the driving shaft 2 and the driven shaft 12 may be obtained by manipulation of the positions of the scoop pipes in relation to the fluid rings.

From the foregoing description of the fluid circulation controls it will be apparent that very fine speed adjustments may be obtained through manipulation of the control handles, and as the fluid reservoir is rotating in unison with the impeller of the coupling that the contained fluid may be readily retained at the required operating temperature, as by the provision of heat radiating fins on the exterior of the rotating assembly. It will also be appreciated that by the provision of the rotating fluid reservoir, wherein the contained fluid is centrifugally maintained in ring form, that this coupling construction is particularly advantageous for use in water craft as rocking or pitching motion will have no effect upon fluid circulation or control.

While I have illustrated and described certain embodiments of my invention and my preferred methods for carrying out the same, it is to be understood that I may make any such alterations or changes as I may deem desirable without departing from the spirit of my invention as set forth in the appended claims.

What I claim as my invention is:

1. A fluid coupling including a driving member and a driven member, a stationary hub, cooperating impeller and runner elements on the members forming between them a working chamber for the coupling liquid, a housing rotating with the impeller and enclosing the impeller and runner elements, an extension on said housing rotatable therewith and journaled on the stationary hub, said extension including a circular fluid containing chamber communicating with the working chamber and a circular fluid reservoir chamber partitioned therefrom, in each chamber of which a centrifugal fluid ring is formed during operation, a freely rotatable disc mounted within each chamber and rotatable under the influence of the centrifugal fluid ring, an open ended embedded fluid scoop pipe extending radially through each disc to a point slightly beyond its peripheral edge, an annular boss on the inner edge of each disc journaled on the stationary hub and through which the scoop pipe passes, said hub having a communicating passage between the scoop pipes of each disc, and an independently operated brake on each boss whereby rotative movement of each disc may be retarded.

2. A fluid coupling including a driving member and a driven member, a stationary hub, cooperating impeller and runner elements on the members forming between them a working chamber for the coupling liquid, a housing rotating with the impeller and enclosing the impeller and runner elements, an extension on said housing rotatable therewith and journaled on the stationary hub, said extension including a circular fluid containing chamber communicating with the working chamber and a circular fluid reservoir chamber partitioned therefrom, in each chamber of which a centrifugal fluid ring is formed during operation, a freely rotatable disc mounted within each chamber and rotatable under the influence of the centrifugal fluid ring, an open ended embedded fluid scoop pipe extending radially through each disc to a point slightly beyond its peripheral edge, an annular boss on the inner edge of each disc journaled on the stationary hub and through which the scoop pipe passes, said hub having a communicating passage between the scoop pipes of each disc, cooperating grooves on each boss and terminal of the passage, and an independently operated brake on each boss whereby rotative movement of each disc may be retarded.

JOHN EDWARD BECKER.

REFERENCES CITED

The following references are of record in the file of this patent:

UNITED STATES PATENTS

| Number | Name | Date |
| --- | --- | --- |
| 1,859,607 | Sinclair | May 24, 1932 |
| 2,187,656 | Kiep et al. | Jan. 16, 1940 |
| 2,284,362 | Birmann | May 26, 1942 |
| 2,422,850 | Porter | June 24, 1947 |
| 2,436,034 | Buehler | Feb. 17, 1948 |